Figure 1:
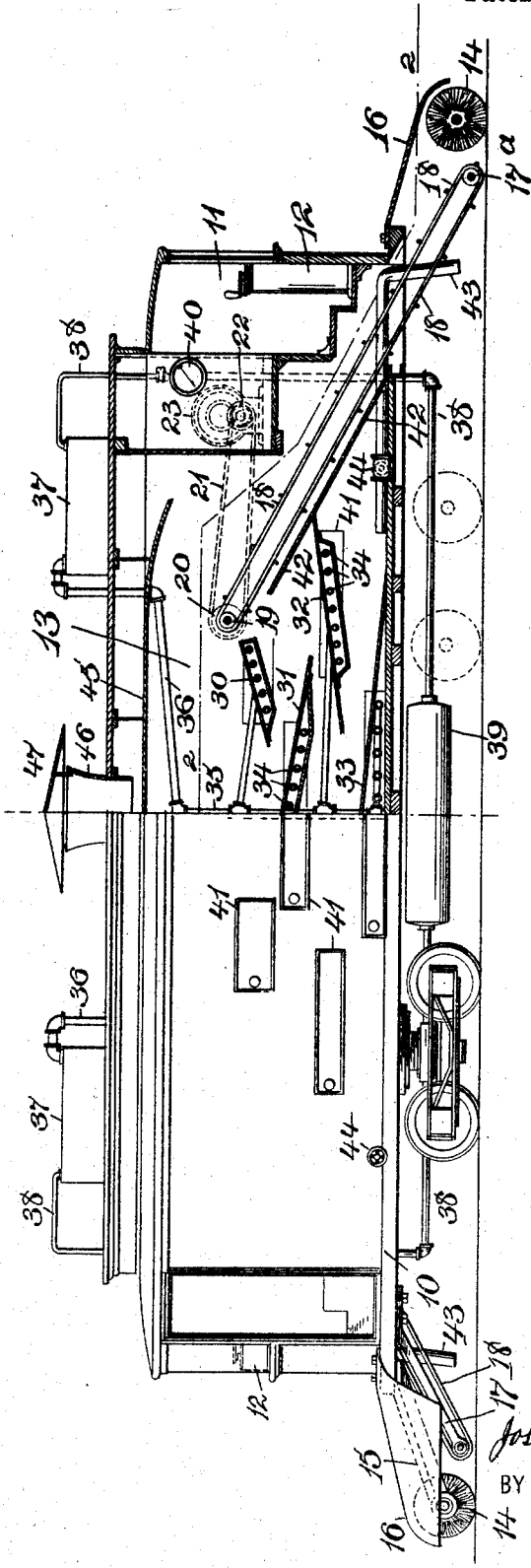

J. W. WEISMANTEL.
SNOW REMOVER.
APPLICATION FILED NOV. 20, 1908.

929,737.

Patented Aug. 3, 1909.
2 SHEETS—SHEET 1.

WITNESSES:
E. A. Peel
S. A. Rogers.

INVENTOR
Joseph W. Weismantel,
BY
Wm H Campbell
ATTORNEY

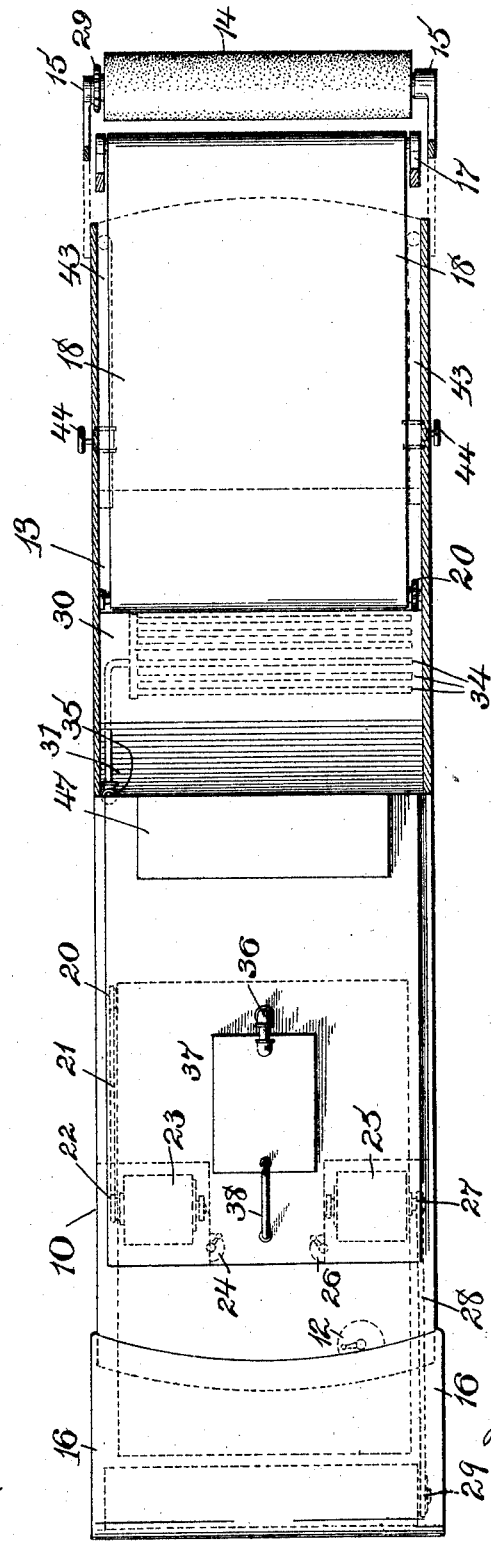

UNITED STATES PATENT OFFICE.

JOSEPH W. WEISMANTEL, OF NEWARK, NEW JERSEY.

SNOW-REMOVER.

No. 929,737.　　　　　Specification of Letters Patent.　　　　Patented Aug. 3, 1909.

Application filed November 20, 1908. Serial No. 463,561.

*To all whom it may concern:*

Be it known that I, JOSEPH W. WEISMANTEL, a citizen of the United States, residing at Newark, in the county of Essex and State of New Jersey, have invented certain new and useful Improvements in Snow-Removers; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a snow remover of the kind that is designed to be made in the form of a vehicle, and to be equipped with means for conveying the snow to the interior of a melting chamber, and subjecting it to a melting heat and then conducting it as water to the outside of the vehicle.

The invention is designed to provide a vehicle, of this kind, that has liquid fuel heaters in the melting chamber, the heaters being inclined at an angle, one above the other to pass the snow down as it is being melted, to make way for the snow and ice that is being carried into the heating chamber as the vehicle progresses.

The invention also provides means for independently operating a brush that sweeps the snow toward the vehicle, and a belt to convey the snow from the brush to the melting chamber.

The invention is illustrated in the accompanying drawings, in which—

Figure 1 is a view of the vehicle, half of it being shown in section, and Fig. 2 is a plan view of the vehicle with one half shown in section on line 2, 2, in Fig. 1.

The device consists of a vehicle body 10 which may be made in the form of a wagon, or as illustrated, in the form of a car, it being provided with vestibules 11, on each end, for the operator, and having a controller 12 to govern the movements and the speed of the remover. The vehicle, on the inside, forms a melting chamber 13. Projecting out from the vehicle, on one or both ends, is a brush 14 transversely arranged and mounted in the ends of the brackets 15 attached to the car body. A shield 16 is placed over this brush so that the snow, ice and dirt do not fly up against the vehicle.

Directly in the rear of the brush are brackets 17 extending downward from the car body, and forming bearings for a roller 17ᵃ over which passes a belt 18, the upper end of which passes over a roller or wheel 19 which is inside the melting chamber. A sprocket wheel 20, on the same shaft as the roller 19, is driven by a sprocket or belt 21 which receives its power from a sprocket 22 which is driven by a motor 23 having a suitable controller 24, shown particularly in Fig. 2.

Suitably disposed, but shown in the drawing as on the other side of the car, is a motor 25 having a controller 26 and transmitting power by means of the sprocket 27, chain 28, and sprocket 29 to the brush 14, the direction of the movement being so regulated that the brush will sweep snow toward the car or vehicle. As the snow is passed up and over the upper edge of the belt, it is deposited on a set of heaters, the upper one, 30, receiving most of the snow and then passing it to a second heater 31, slightly below it installed at a reverse angle, and onto a third heater 32, and then being deposited on a bottom heater 33.

It will thus be seen that the heaters quickly pass the snow down, as it will slide off of them after it becomes partly melted, the water helping the descent. In each heater are the heating pipes 34 which are adapted to form burners for liquid fuel, and are supplied by a central pipe 35 which is supplied by pipes 36 passing to the tanks 37, on the top of the vehicle, these tanks holding gasolene or other similar liquid fuel, the fuel being under pressure, as is usually the case when liquid fuel is used, the pressure being supplied through the pipe 38 connected with the reservoir or tank 39 holding compressed air, this tank being also used, in most vehicles, for braking purposes. A gage 40, suitably installed, indicates the pressure on the tank.

Doors 41, on the ends of the heaters, allow them to be cleaned and inspected, and the doors can be made with a mica panel so that it can be seen whether the burners are working properly or not. A plate 42, underneath the belt inside the melting chamber, tends to confine the heat and prevent cold air from rushing into the melting chamber. Outlet pipes are placed in the melting chamber at the bottom thereof, and are designed to lead the melted snow in the shape of water to the outside of the vehicle and deposit it, each pipe preferably having a valve 44. This valve can be normally left open, or, if desired, it can be closed and the water allowed to accumulate and be deposited at a predetermined point. A baffle-plate 45 is installed near the top of the melting chamber, and is designed, in conjunction with the flue 46 and the cap 47, to provide a ready means for the escape of steam and moisture in the melting chamber, at the same time acting to retard these sufficiently so as to not allow the melting chamber to cool.

This remover, with its particular arrangement of inclined heaters, with the liquid fuel heaters, and with the coöperating arrangement of the elements, as shown, is thought to provide an apparatus, of this kind, that is very efficient, and has rapid melting facilities that will prevent the melting chamber becoming clogged.

It will be seen that the snow remover can be used with the forward brush and conveyer in operation, and the other brush and conveyer can be used on the return, when the car is running the other way, although in case of a heavy snow-fall, both brushes and conveyers can be used, and thus thoroughly pick up all the snow, the capacity of the heater being such that it is adapted to take care of both conveyer belts simultaneously, since each heater has a duplicate on the other end of the car.

Having thus described my invention, what I claim is:—

1. A snow remover comprising a vehicle containing a melting chamber, means for conveying snow from the outside to the melting chamber, and a series of heaters disposed at reverse angles one above the other and thus adapted to pass the snow downward.

2. A snow remover comprising a vehicle containing a melting chamber, means for conveying snow from both ends of the vehicle to the melting chamber, a series of heaters in the melting chamber to receive snow from the conveying means, and a valved outlet pipe from the melting chamber.

3. A snow remover comprising a vehicle containing a melting chamber, a series of heaters in the melting chamber, liquid fuel burners in the heaters, a liquid fuel reservoir on the vehicle, means for conveying snow from the outside to the melting chamber, the heaters being disposed at reverse angles one above the other, and means for conveying water from the melting chamber.

4. A snow remover comprising a vehicle containing a melting chamber, a series of heaters disposed in the melting chamber, a conveying belt from the outside to the melting chamber, a brush arranged to rotate to feed snow on the belt, a valved outlet pipe from the melting chamber, an outlet pipe from the melting chamber, an outlet pipe at the top of the melting chamber, and a baffle-plate adjacent to the last said outlet pipe.

5. A snow remover comprising a vehicle containing a melting chamber, a series of heaters in the melting chamber and disposed at reverse angles one above the other, a conveying means for carrying snow from both ends of the vehicle to the melting chamber, heaters arranged to receive the snow, liquid fuel burners for supplying the heaters with heat, reservoirs for fuel on the vehicle, a valved outlet pipe in the melting chamber, and means for operating the conveying means.

6. A snow remover comprising a vehicle containing a melting chamber, a series of heaters arranged at reverse angles one above the other in the melting chamber, a conveying belt in each end of the vehicle extending from the outside of the vehicle to the melting chamber, brushes to feed snow to the conveying belt, means for operating the belt, liquid fuel burners in the heaters, liquid fuel reservoirs to supply fuel to the burners, valved outlet pipes at the bottom of the melting chamber, an outlet flue at the top of the melting chamber, and a baffle-plate adjacent to the flue.

7. A snow remover comprising a vehicle containing a melting chamber, means for conveying snow from the outside of the vehicle to the melting chamber, heaters disposed to melt the snow and pass it from one to the other in the melting chamber, liquid fuel burners extending under the heaters transversely of the vehicle, and doors on the side of the vehicle to uncover the burners.

8. A snow remover comprising a vehicle containing a melting chamber, conveying belts leading from the outside of the vehicle to the melting chamber at each end of the vehicle, brushes to feed snow to the belts, a motor, and means for operating a conveying belt from the motor, a second motor with an operative connection for rotating the brush in each end of the vehicle, liquid fuel burners incased by heaters arranged in the melting chamber, means for supplying fuel to the burners, a valved outlet pipe at the bottom of the melting chamber, an outlet pipe at the top of the melting chamber, and a baffle-plate adjacent to the second outlet pipe.

In testimony, that I claim the foregoing, I have hereunto set my hand this 27 day of May 1907.

JOSEPH W. WEISMANTEL.

Witnesses:
  E. A. PELL,
  WM. H. CAMFIELD.